F. PYSZ.
SAW FILING MACHINE.
APPLICATION FILED JUNE 10, 1915.
1,169,997.
Patented Feb. 1, 1916.
4 SHEETS—SHEET 4.
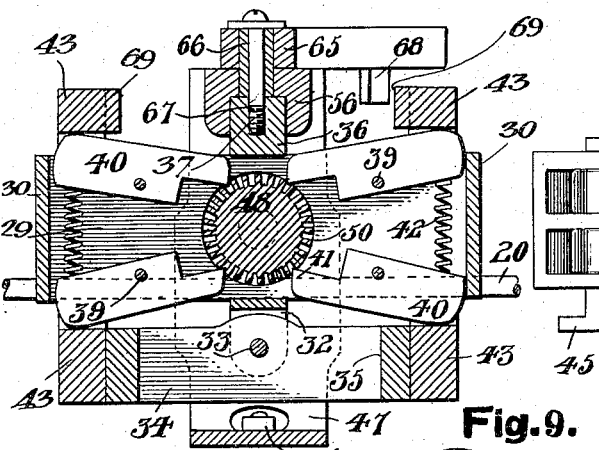
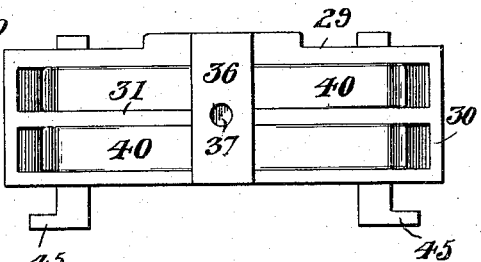
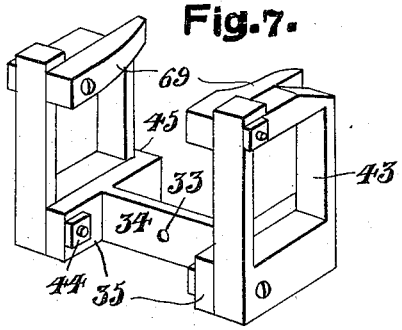
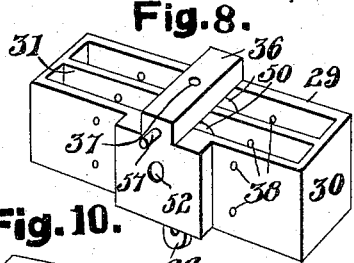
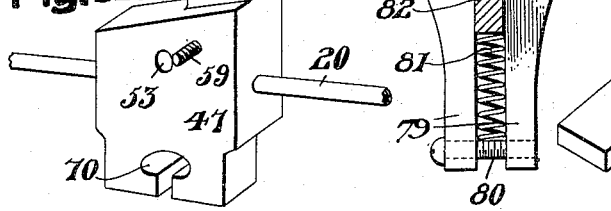
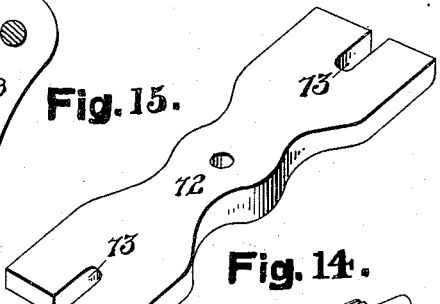
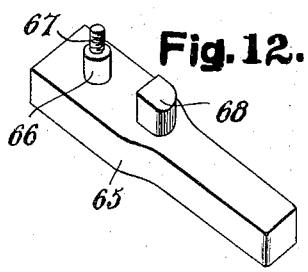
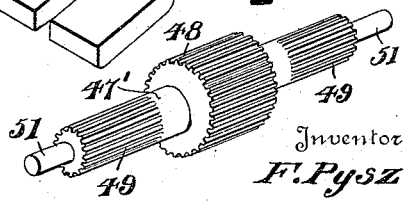
Inventor
F. Pysz
By N. M. Wilson
Attorney
THE COLUMBIA PLANOGRAPH CO., WASHINGTON, D. C.

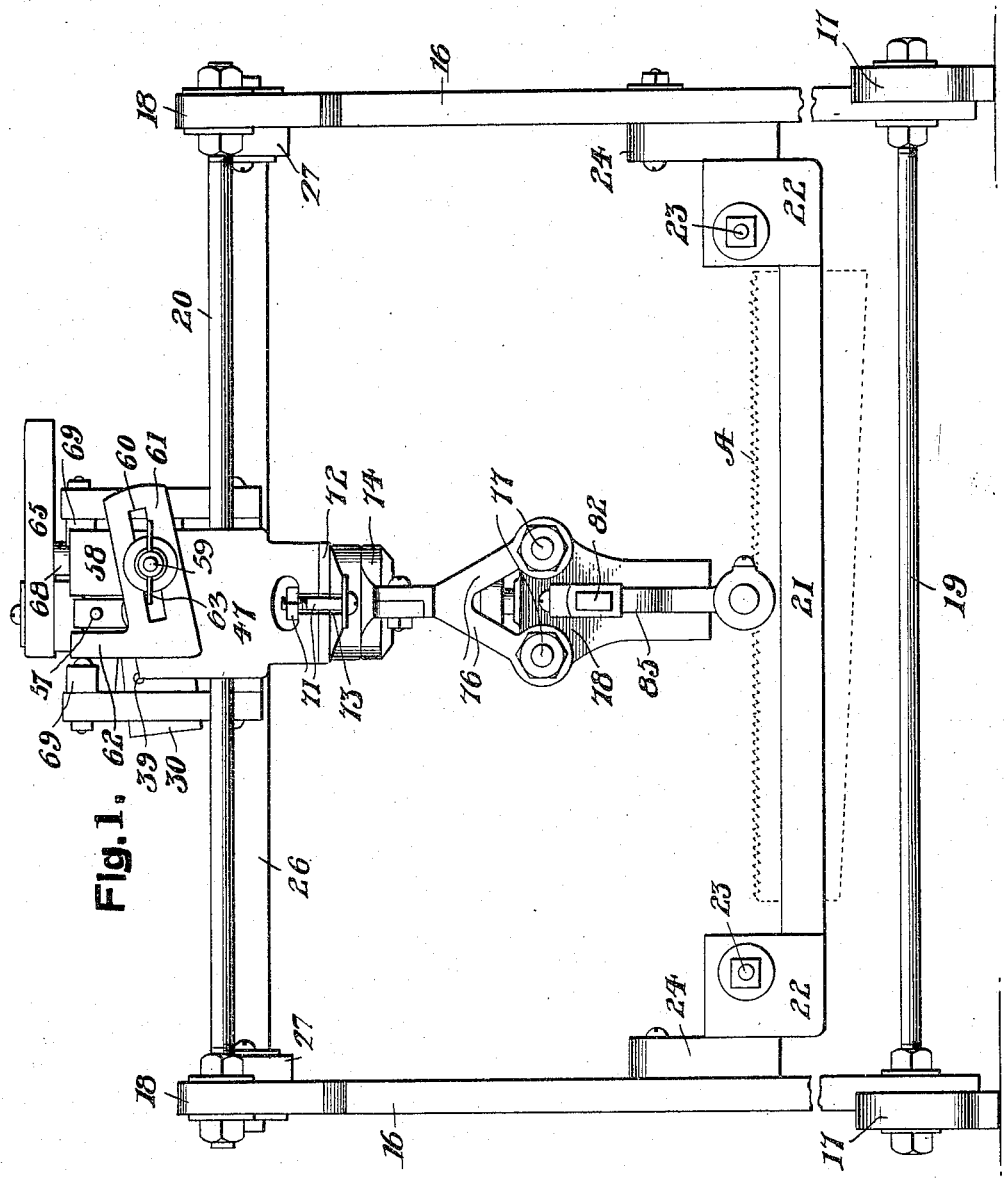

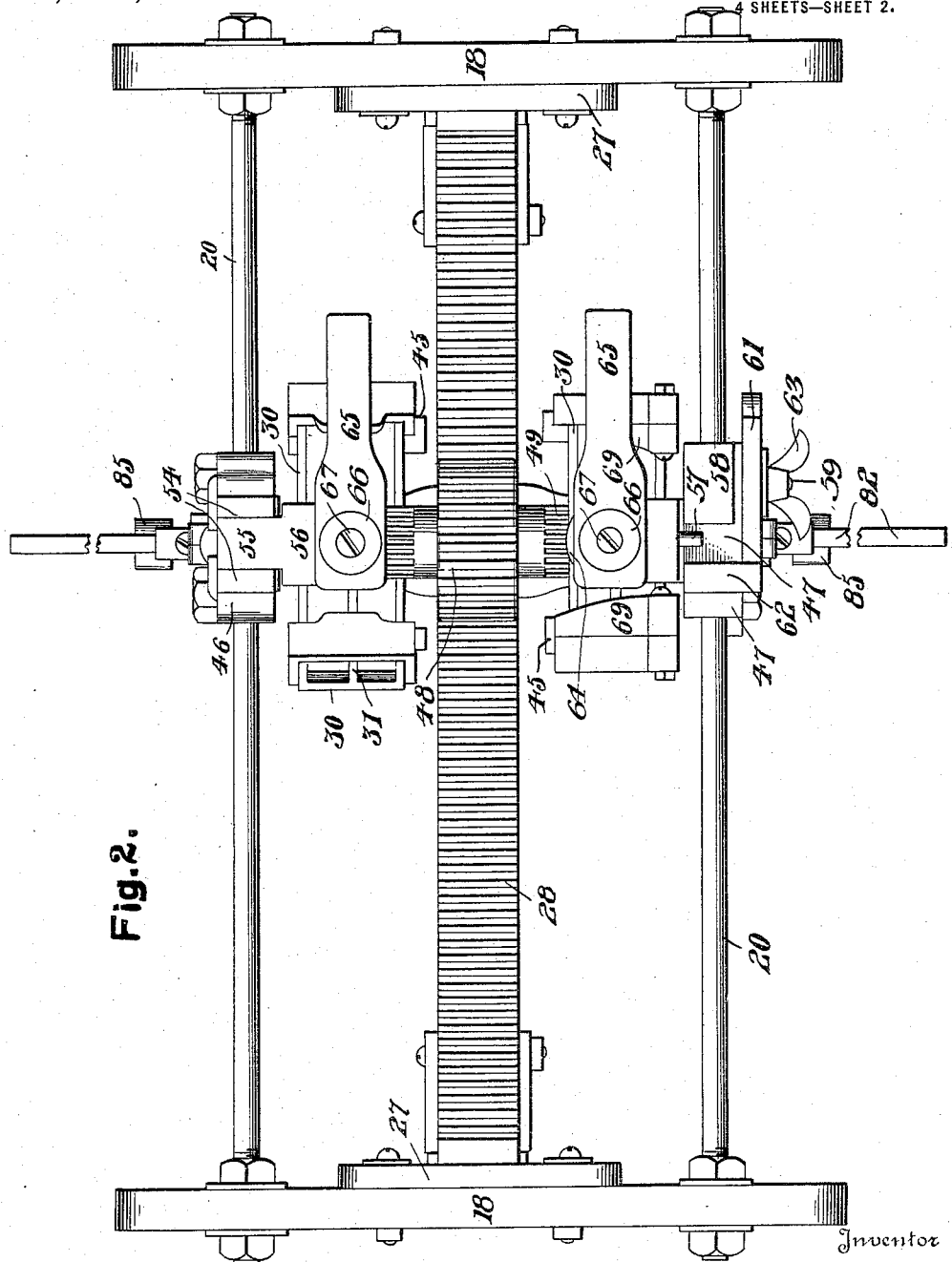

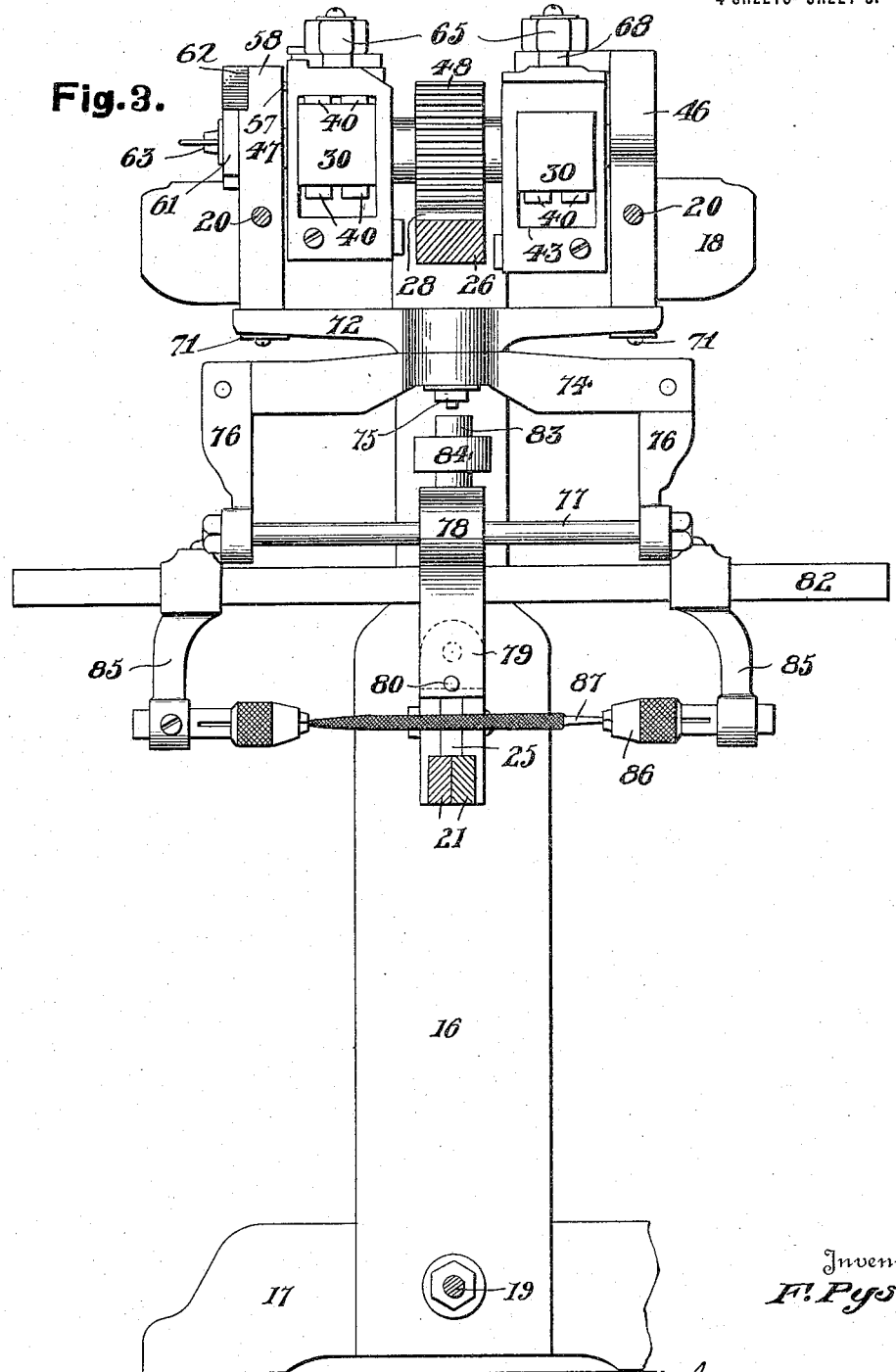

UNITED STATES PATENT OFFICE.

FRANK PYSZ, OF TAUNTON, MASSACHUSETTS.

SAW-FILING MACHINE.

1,169,997.

Specification of Letters Patent.

Patented Feb. 1, 1916.

Application filed June 10, 1915. Serial No. 33,283.

*To all whom it may concern:*

Be it known that I, FRANK PYSZ, a subject of the Emperor of Austria-Hungary, residing at Taunton, in the county of Bristol and State of Massachusetts, have invented certain new and useful Improvements in Saw-Filing Machines, of which the following is a specification.

This invention relates to certain new and useful improvements in saw filing machines.

The primary object of the present invention is to provide a saw filing machine in which there is provided clamping means for holding a saw in position to have the teeth thereof filed and mechanism for supporting a file being shiftable relative to the saw to move the file into position for filing successive teeth.

Another object of the invention is to provide a saw filing machine in which there is provided clamping means for holding a saw in position to have the teeth sharpened and ratchet mechanism associated with the machine frame for moving the file the distance of a single tooth or any desired distance to correctly position the file relative to the saw teeth.

A still further object of the invention is to provide a resiliently mounted file for sharpening saw teeth in which the depth of cut of the file may be regulated.

With these general objects in view and others that will appear as the nature of the invention is better understood, the same consists in the novel construction, combination and arrangement of parts hereinafter more fully described, illustrated in the accompanying drawings, and pointed out in the appended claims.

In the drawings forming a part of this application and wherein like designating characters refer to corresponding parts throughout the several views:—Figure 1 is a side elevational view of the saw filing machine built in accordance with the present invention, with a saw to be sharpened shown in dotted lines, and with the supporting frame partially broken away. Fig. 2 is a top plan view of the same. Fig. 3 is a vertical sectional view of the machine. Fig. 4 is a detached longitudinal sectional view of the pawl inclosing housing positioned at one side of the machine for preventing retrograde movement of the file supporting mechanism while being shifted in the desired direction. Fig. 5 is a detached top plan view of the pawl inclosing housing. Fig. 6 is a cross-sectional view of a portion of the file supporting mechanism with the member for resiliently supporting the file shown in end elevation. Figs. 7 to 13 inclusive are detached detail perspective views of the pawl inclosing housing and mechanism intimately associated therewith for shifting the file relative to the machine. Fig. 14 is a detached perspective view of the ratchet cylinder, the ends of which extend into each pawl inclosing housing, and, Fig. 15 is a detached detail perspective view of the plate that connects the file support to the ratchet mechanism.

Briefly described, the present invention aims to provide a saw filing machine including a supporting frame and saw clamping means carried by the frame. Independently operated pawl and ratchet devices are adapted to be moved to positions to cause the same to move in one direction, one of the devices causing each to be shifted while the other device prevents retrograde movement. A resiliently-mounted file is associated with the pawl and ratchet devices and is moved relative to the saw to cause successive teeth or desired spaced teeth to be filed. A gage is associated with the pawl and ratchet device that performs the shifting operation and controls the movement of the file, while the mechanism for supporting the file is adjustable to permit the file to be moved at an angle relative to the saw teeth.

Referring more in detail to the accompanying drawings, the reference numeral 16 designates end standards provided with supporting feet 17 and cross-heads 18. The end standards are connected by a single lower connecting rod 19 and a pair of upper connecting rods 20 positioned adjacent each end of the cross-head 18. With the use of clamping nuts as shown in Figs. 1 and 2, the end standards 16 are held in rigid position.

The saw clamp is connected at its ends substantially mid-way the heights of the end standards and includes a pair of saw-engaging bars 21 secured at their ends to a pair of blocks 22 connected by a bolt 23. A hanger 24 is connected to the inner face of each of the end standards 16 and carries an outwardly-projecting lug 25 positioned between the clamping blocks 22 and through which the bolt 23 extends. It will be seen that upon tightening of the bolts that the saw A, shown in dotted lines in Fig. 1, will be clamped in rigid condition. A bar 26 extends longitudinally of the frame and is connected at its ends to supporting plates 27 carried by the cross-heads 18 while the upper face thereof is provided from end to end with rack teeth 28.

The mechanism for moving the file relative to the frame and saw A is associated with the upper connecting rods 20 and the rack bar 26 and includes means for moving a file in the desired direction and means for preventing retrograde movement of the file and operating mechanism. These devices are similar in construction but are associated with mechanism to cause the same to perform the desired function and the following specific description will cover both devices: Each device includes the pawl inclosing housing comprising side walls 29 and end walls 30, the housing being open at its top and bottom and provided with a longitudinal central partition 31 and a pair of depending lugs 32 carried thereby adapted to straddle and be pivoted as at 33 to the web 34 of the H-shaped member 35. Each housing includes an upstanding centrally-positioned shoulder 36 provided with a threaded opening 37 for purposes to be later described. Alined transverse openings 38 more clearly shown in Fig. 8 are provided in the side walls and central partition of the pawl inclosing housing and are adapted to receive pivot pins 39 which support the pawls 40, the end of the pawl being provided with a tooth 41 adapted to engage the ratchet cylinder to be later described. The ends 41 of the pawls 40 are normally forced toward each other as shown in Fig. 4 by the expansion coil springs 42 engaging the outer ends of the pawls and positioned within the housing.

Means is provided to force the operating ends of the pawls into engagement with the ratchet cylinder and includes a pair of end members 43 connected to the outer faces of the ends 35 of the H-shaped member by fastening bolts 44, an angle lug 45 being carried by the ends of the H-shaped member to be positioned engaging the end members 43 to assist the bolts 44 in holding the same in position. The end walls 30 of the pawl inclosing housing extend through openings in the end members 43 as do also the rear ends of the pawls 40 so that when the H-shaped member 35 moves on its pivot 33 to the left in Fig. 4, the said end members 43 engage the outer ends of the upper left hand pawl and the lower right hand pawl and throw it out of engagement with the ratchet cylinder. At the same time, the end members 43 are disengaged from the outer ends of the other pawls, and the springs 42 pressed thus into engagement with the ratchet cylinder. This operation will be readily understood by reference to Fig. 4.

A pair of slide blocks 46 and 47 is mounted on the upper connecting rods 20, one of these blocks being associated with one of the inclosing housings to prevent retrograde movement of the other pawl inclosing housing when the same is moving in a desired direction, the other sliding block including a gage device 61 for limiting the movement of the pawl inclosing housing associated therewith.

A ratchet cylinder 47' including a centrally-positioned gear wheel 48 is mounted on the frame for engagement with the rack bar 26 and is further provided with a pair of ratchet portions 49 to be received in an enlarged opening 50 provided in the inner wall of each pawl inclosing housing, the ends of the ratchet cylinder 47 being provided with stub axles 51 passing through bearing openings 52 in the outer walls of the inclosing housings and received in journal openings 53 in the slide blocks 46 and 47. The upper end of the slide block 46 is centrally recessed to provide a pair of corner lugs 54 between which the extension 55 of a cap plate 56 is received, the cap plate 56 adapted to be positioned on the centrally-positioned shoulder 36 of the pawl inclosing housing 29. It will therefore be seen that the housing 29 is held immovable relative to the sliding block 46 and that movement of the H-shaped member 35 and end members 43 carried thereby will cause the desired pawls to engage the ratchet portion 49 of the shaft 47. The other pawl inclosing housing is adapted to be operated to move both blocks longitudinally of the supporting frame in the desired direction and has an outwardly projecting pin 57 adapted to engage an upstanding lug 58 carried by the slide block 47. In order to limit the oscillatory movement of the file shifting housing, I have provided a laterally projecting screw 59 on the sliding block 47 to be positioned in the slot 60 of a slide gage 61, an upstanding lug 62 being carried by the gage while an adjusting nut 63 associated with the screw 59 holds the slide gage in the desired position as shown in Fig. 1 which will limit the swinging movement of the pawl inclosing housing for shifting the file. A cap 64 shown in Fig. 9 is positioned on the shoulder 36 of this housing and is provided with an opening registering with the threaded opening 37 in the shoulder.

The mechanism for causing the desired pawls to engage the ratchet portions 49 of the cylinder 47 includes an operating handle 65 shown in detail in Fig. 12 and carrying adjacent one end thereof a tubular stud 66 through which extends a screw 67. The tubular studs 66 are adapted to be positioned in the openings provided in the cap plates 56 and 64 with the screw 67 received in the threaded openings 37 of the shoulders 36 of the H-shaped members. A cam-faced lug 68 depends from each of the operating handles 65 and is adapted to be moved into engagement with cam blocks 69 provided on the inner upper end of each of the end members 43 as clearly shown in Fig. 7. It will therefore be seen that movement of the operating handles 65 on studs 66 as pivots will cause the cam lugs 68 carried thereby to be moved into engagement with the cam blocks 69, thereby to shift the end members 43 on their pivotal connection 33 to engage desired ones of the pivoted pawls to cause the upper right hand pawls and the lower left hand pawls to operatively engage the ratchet portions 49 of the ratchet cylinder 47′. The direction of movement of the pawl inclosing housings is determined by the direction in which the operating handles 65 project, as in Fig. 2, by pressing down on the handle 65 at the right hand side of the machine, movement of the pawl inclosing shifting housing is obtained and by subsequently raising the handle, the engaged pawls will ratchet over the adjacent ratchet teeth 49. During this operation, the pawl inclosing housing at the opposite side of the machine remains horizontal and the pawls carried thereby which engage the ratchet cylinder will prevent retrograde movement of this cylinder and thereby hold the same in adjusted position. Rocking motion is given the H-shaped member 35 by the handle 65 and this motion is translated into rotary motion of the shaft 47′.

The lower ends of the sliding blocks 46 and 47 are provided with T-shaped openings 70 in which are positioned the screw shank and nut 71 shown more clearly in Fig. 1, while the head of each screw is provided with a washer constituting a broad support for the cross plate 72 shown in Fig. 15. This plate 72 is provided with a slot 73 at each end thereof adapted to receive the screw shank and be supported thereby. The mechanism for supporting the file is carried by the cross plate 72 and includes a cross head 74 provided with a central opening registering with a central opening in the plate 72 and through which a retaining bolt 75 is positioned. Each end of the cross arm 74 carries a forked member 76 having fixed in the lower ends thereof a pair of parallel rods 77. A sliding block 78 is mounted on the rods 77 and is preferably of the shape shown in Fig. 6 including a main body-portion and depending lugs 79 with a transverse screw 80 positioned at the lower end thereof. A compression coil spring 81 is positioned between the two legs 79 and engages the screw 80 at its lower end while the upper end is engaged by a handle bar 82 which is adapted to move up and down against the tension of the spring. A stud 83 is positioned in a central opening provided in the sliding block 78 and is fixed at its lower end to the handle bar 82 while the upper projecting end of the stud receives a collar 84 which may be adjustable over the stud to regulate the lowering movement of the handle bar against the tension of the spring by the said collar engaging the upper face of the sliding block 78. A pair of hangers 85 is fixed to the handle bar 82 in adjusted positions and carry at their lower ends tool sockets 86 into which are received the ends of a file 87.

From the above detailed description of the invention, it is believed that the operation thereof will be readily apparent, it being noted that the direction in which the handles 65 point indicates the direction of movement of the pawl mechanism. The cap plate 56 and extension 55 hold the pawl inclosing housing at one side of the machine in fixed position relative to the sliding block 46 and by positioning the handle 65 in either direction, the upper and lower pawls at the opposite side of the housing are made operative to have the points 41 engage the ratchet teeth 49 to prevent a reverse movement of the file shifting mechanism. The other pawl inclosing housing carrying the gage plate 61 may be moved so that the pawls carried thereby engaging the ratchet cylinder will revolve the same and cause the central gear wheel 48 to mesh with the rack bar 26 and move the file and supporting mechanism therefor over the saw teeth, the length of movement being regulated by the gage plate and the pin 57 engaging the lug 62 and also the lug 58 on the sliding block 47. When it is desired to file the saw teeth at an angle the screw 75 may be loosened and the cross-head 74 moved to the desired angle. The sliding head 78 moves over the rods 77 and carries the handle bar 82 by which it is shifted and also the file 87. The depth of cut or filing of the teeth may be regulated by the collar 84 and the file may be reciprocated until the collar engages the upper end of the block 78, the cut of the teeth being gradual by reason of the spring support 81 for the handle bar.

While the forms of the invention herein shown and described are what are believed to be preferable embodiments thereof, it is nevertheless to be understood that various forms, modifications and arrangements of the parts may be made without departing from the spirit and scope of the invention as set forth in the appended claims.

What I claim as new is:—

1. A saw filing machine including a supporting frame, a rack bar carried by the frame, independently operated pawl and ratchet devices slidably mounted on the frame at opposite sides of the rack bar, a gear wheel carried by the pawl and ratchet devices and in engagement with the rack bar, file supporting mechanism carried by the pawl and ratchet devices, and a file carried by the file supporting mechanism.

2. A saw filing machine including a frame, a rack bar carried by the frame, a cylinder including a centrally-positioned gear wheel in mesh with said rack bar, ratchet teeth formed on said cylinder laterally of the gear wheel, pawl inclosing housings and pawls inclosing the ratchet portions of the cylinder, one of said housings made operative to revolve the gear wheel in one direction, the other of said housings made operative to prevent retrograde movement of the gear wheel, and a file and supporting mechanism therefor carried by said ratchet mechanism.

3. A saw filing machine including a frame, independently operated pawl and ratchet devices mounted on the opposite sides of said frame, a file resiliently supported thereby, one of said pawl and ratchet devices adapted to move the file a predetermined distance and the other of said pawl and ratchet devices adapted to prevent retrograde movement.

4. A saw filing machine including a frame, a rack bar carried thereby, slide blocks associated with said frame, pawl inclosing housings mounted on said frame, a ratchet cylinder engaging said rack bar and extending into the housings, pawls and supporting means therefor within said housings, said pawls adapted to engage the ratchet cylinder, means carried by one of said housings and associated with one of said sliding blocks to prevent relative movement of the housing and blocks associated therewith, the other of said housings adapted to move relative to the sliding block associated therewith, means for limiting the movement of the last-named housings, and a file carried by said slide blocks.

5. A saw filing machine comprising a frame having end standards, rods connecting the standards, a rack bar arranged parallel to the rods, a block slidably mounted on each rod, a cylinder including a centrally positioned gear wheel in mesh with the rack bar, and laterally positioned ratchet surfaces, housings mounted on the ratchet portions of the cylinder, spring-pressed pawls carried by the housings on opposite sides of the cylinder, means for causing selected pawls to engage the ratchet portions of the cylinder, means for holding one of said housings immovable relative to the adjacent sliding block, means to limit the movement of the other housing relative to the adjacent sliding block, and a file supported by said blocks.

6. A saw filing machine including a frame, a file support slidably associated with said frame, pawl and ratchet devices positioned at opposite sides of the frame for controlling the movement of the file relative to the frame, one of said pawl and ratchet devices adapted to prevent retrograde movement of the file when moving in one direction.

7. A saw filing machine including a frame, a rack bar carried thereby, a gear wheel in mesh with said rack bar, lateral ratchet portions carried by the gear wheel, spring-pressed pawls engaging the ratchet portions for moving the gear over the rack bar, file supporting mechanism carried by the pawl and ratchet devices, and a file carried by the supporting mechanism.

8. A saw filing machine including a frame, a file support movable longitudinally of the frame, said support including a cross-head, a forked member carried by each end of the cross-head, parallel rods carried by the forked members, a sliding block mounted on the rods, a handle bar resiliently mounted in the slide block, file holders carried by the handle bar, cushioning means for the handle bar, and means for limiting the lowering movement thereof.

9. A saw filing machine including a frame, a rack bar carried thereby, pawl and ratchet mechanism including a centrally positioned gear wheel in mesh with said rack bar and slidably mounted on said frame, and a file and support therefor carried by said pawl and ratchet mechanism.

10. A saw filing machine including a frame, a file support carried thereby, pawl and ratchet mechanism for moving said support relative to the frame including housings, a cylinder journaled in said frame having ratchet portions within the housings, a rack bar carried by said frame, a gear wheel carried by the cylinder and in mesh with said rack bar, spring-pressed pawls pivotally mounted within said housings, an operating handle pivoted to each of said housings, and means adapted to be engaged by said handles to be moved into engaging position with said pawls to cause selected ones of said pawls to operatively engage the ratchet surfaces of the cylinder to move the housings in one direction and prevent retrograde movement thereof.

11. A saw filing machine including end standards, horizontal rods connecting the same, sliding blocks mounted on the rods at the upper ends of the standards, a rack bar arranged parallel to said connecting rods, a cylinder including a gear wheel in mesh with said rack bar, ratchet portions on said cylinder spaced laterally of the gear wheel, housings inclosing the ratchet portions of the cylinder, spring-pressed pawls within the housings engaging said ratchets, means carried by one of said housings engaging the adjacent sliding block to prevent movement of the housing relative to the block, and means for limiting the oscillating movement of the other housing.

12. A saw filing machine including a frame, a rack bar carried thereby, a cylinder including a gear wheel in mesh with said rack bar, ratchet faces formed on said cylinder laterally of the gear wheel, housings inclosing the ratchet portions of the cylinder, pivoted pawls within the housings adapted to engage the ratchet portions of the cylinder, one of said housings adapted to be oscillated to cause the gear wheel to move over said rack bar, and means movable independently of the other housing to cause selected pawls to engage the adjacent ratchet portions of the cylinder to prevent retrograde movement of the other housing and pawls.

In testimony whereof I affix my signature.

FRANK PYSZ.

Copies of this patent may be obtained for five cents each, by addressing the "Commissioner of Patents, Washington, D. C."